(12) United States Patent
Mo et al.

(10) Patent No.: US 7,672,229 B2
(45) Date of Patent: Mar. 2, 2010

(54) METHOD FOR DISTRIBUTING DYNAMIC LINK BANDWIDTH FOR RESILIENT PACKET RING

(75) Inventors: Li Mo, Shenzhen (CN); Xuefei Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1064 days.

(21) Appl. No.: 10/541,325

(22) PCT Filed: Jan. 2, 2003

(86) PCT No.: PCT/CN03/00002

§ 371 (c)(1), (2), (4) Date: Nov. 2, 2005

(87) PCT Pub. No.: WO2004/062195

PCT Pub. Date: Jul. 22, 2004

(65) Prior Publication Data

US 2006/0106672 A1    May 18, 2006

(51) Int. Cl.
*H04J 1/16* (2006.01)
*H04J 3/16* (2006.01)
*H04L 12/28* (2006.01)

(52) U.S. Cl. .................. 370/222; 370/404; 370/465

(58) Field of Classification Search ........... 370/222, 370/404, 465
See application file for complete search history.

(56) References Cited

U.S. PATENT DOCUMENTS

| 5,546,377 | A | | 8/1996 | Ozveren | |
|---|---|---|---|---|---|
| 6,002,667 | A | | 12/1999 | Manning et al. | |
| 6,324,184 | B1 | | 11/2001 | Hou et al. | |
| 7,126,910 | B1 | * | 10/2006 | Sridhar | 370/229 |
| 7,336,680 | B2 | * | 2/2008 | Sorenson et al. | 370/468 |
| 7,397,813 | B2 | * | 7/2008 | Choe et al. | 370/438 |
| 7,436,852 | B2 | * | 10/2008 | Nam et al. | 370/468 |
| 2003/0163593 | A1 | * | 8/2003 | Knightly | 709/251 |
| 2004/0032826 | A1 | * | 2/2004 | Sridhar | 370/222 |
| 2005/0275752 | A1 | * | 12/2005 | Li et al. | 348/398.1 |
| 2006/0126651 | A1 | * | 6/2006 | Yu | 370/404 |

FOREIGN PATENT DOCUMENTS

CN    1218592    6/1999

* cited by examiner

*Primary Examiner*—Andrew Lee
(74) *Attorney, Agent, or Firm*—Connolly Bove Lodge & Hutz LLP

(57) ABSTRACT

The invention discloses a method for dynamically allocating link bandwidth on resilient packet ring. This algorithm comprises the steps of measuring a group of variables in one advertisement interval, calculating the local fair rate using the measured variables, determining an advertising rate based on the local fair rate, and transmitting the data packets with the advertising rate. Compared with existing fairness algorithms, the new algorithm introduces integration for the idle rate to achieve 100% of bandwidth utilization. It also avoids using the concept of "congestion state" which is essential in the existing fairness algorithm.

4 Claims, 10 Drawing Sheets

METHOD FOR DISTRIBUTING DYNAMIC LINK BANDWIDTH FOR RESILIENT PACKET RING

This application is a National Stage application of PCT/CN2003/000002, filed Jan. 2, 2003. The entire contents of the aforementioned application are incorporated herein by reference.

FIELD OF THE INVENTION

This invention relates to data communication technology used in Wide Area Network (WAN) or Local Area Network (LAN), more particularly, to a method for dynamically allocating link bandwidth on Resilient Packet Ring (RPR).

BACKGROUND OF THE INVENTION

RPR is a metropolitan area network (MAN) with a brand-new ring structure, which supports the data traffic for three service levels, and has the advantages of high bandwidth utilization, high reliability and so on. One of the key techniques for implementing RPR is to allocate the link bandwidth to the nodes competing for resources on the ring. The present invention discloses a method for dynamically allocating link bandwidth on resilient packet ring. Compared with the solution proposed by the current PRP working group (IEEE 802.17 working group), this method is simpler and has higher bandwidth utilization. The mission of IEEE 802.17 working group is to establish a technical standard for RPR. The RPR technology is used in the data communication in WAN or LAN, and compared with the existing data communication technology used in WAN or LAN, it has two obvious advantages:
1. higher bandwidth utilization.
2. fast protection mechanism. The protection kicks in within 50 ms, which is on the same level as fault detection.

Each node on the RPR ring can insert some fairness eligible packet on to the ring. Once a data packet is added on to the ring, it will be passed on by the downstream nodes. During this process, the upstream node may transmit too much traffic, leaving the downstream nodes "starved". So a mechanism is needed to ensure each node on the ring has the same opportunity to transmit user's data packets.

In the mechanism proposed by IEEE 802.17 working group, each node will transmit a special packet, named fairness packet, which is used to pass a proposed advertising rate to the upstream node.

In order to ensure that every node on the ring has some chance to send its packets, each node will make sure that the amount of Fairness Eligible packets added to the ring not exceeding an allowed rate, which is the smaller one of the received advertising rate and the local fair rate.

The key point to guarantee the network performance lies on how to determine the advertising rate based on the advertising rate received from the downstream node and the local fair rate. The mechanism proposed by IEEE 802.17 working will be described briefly.

At present, there are two fairness modes proposed by IEEE 802.17 working group, one is named aggressive mode, the other is named conservative mode.

Here only un-weighted version is discussed for the existing fairness algorithm proposed by IEEE 802.17. It is noted that the method for dynamically allocating link bandwidth on resilient packet ring proposed in the present patent application is a weighted fairness algorithm.

The existing fairness algorithm is described as following:

add rate (add_rate): this is the byte count, in an advertisement interval, for local packets added onto the ring by the node for the FE eligible packets;

local fair rate (local_fair_rate): the low pass filtered add rate, different modes employ different algorithms to obtain local_fair_rate;

received advertising rate (received_advertising_rate): the advertising rate carried in type A fairness packet, which is advertised by the downstream node.

advertisement interval: On every advertisement interval, a type A fairness packet will be send to the upstream stations, with advertising_rate inside the type A fairness message.

advertising rate: the rate is determined as follows:
  If (the local node is congested and local_fair_rate<received_advertising_rate ), the advertising_rate will be the local_fair_rate, which is a filtered version of the add_rate. The add_rate is the byte count within the advertisement Interval for packets with FE bit (fairness eligible bit) set. The received_advertising_rate is the rate carried inside the type A fairness message.
  If (the local node is congested and local_fair_rate>=received_advertising_rate ) congested, the advertising_rate will be the received advertising rate from downstream (received_advertising_rate).
  If (the local node is not congested), the advertising_rate will be the ones received from downstream, or null if receiving null rate, which indicates the maximum link rate.

The main difference, along with some minor ones, between the aggressive mode and the conservative mode lies on how to define the local_fair_rate. In the aggressive mode, the local_fair_rate is the low pass filtered version of the add_rate. In the conservative mode, the local_fair_rate is the low pass filtered version of the add_rate, which is similar to that of aggressive mode, and
  plus a fraction of the filtered version of the add_rate if the link utilization is less than 85% (below low_threshold)
  minus a fraction of the filtered version of the add_rate if the link utilization is more than 95% (above high_threshold)

Compared to the fairness algorithm in the aggressive mode, the fairness algorithm in the conservative mode offers better performance under varying conditions, at the cost of maximum 95% bandwidth utilization, which is inferior under certain situations.

The main issue with the aggressive mode is, when the congestion point is not a greedy source, as illustrated in FIG. 1, the bandwidth can not be properly allocated among all the sources and result in inefficient resource usage, as illustrated in simulation in FIG. 2.

SUMMARY OF THE INVENTION

In summary, the main issue with the fairness algorithm in aggressive mode is the stability of the bandwidth allocation when non-greedy source is mixed with greedy source, which leads to bandwidth wastage. The main issue with the fairness algorithm in conservative mode is maximum 95% bandwidth utilization, which leads to inferior performance when all the sources are greedy sources.

The objective of the present invention is to provide a method for dynamically allocating link bandwidth on resilient packet ring, which can ensure the fairness of the bandwidth allocate. It should be simpler, and should yield higher bandwidth utilization than the existing fairness algorithm in 802.17 standard drafts.

The method for dynamically allocating link bandwidth on resilient packet ring keeps the basic structure and message type as defined by the IEEE 802.17 working group for conformance purposes. The concept of advertisement interval is used. Within one advertisement interval, the following steps are implemented:

a. measure the values for variables
  1. add_rate: This is the byte count for local packets added onto the ring by the node for the fairness eligible packets.
  2. total_add_rate: This is the total byte count for local packets added onto the ring by the node.
  3. fw_rate: This is the byte count for transit packets on the ring for the fairness eligible packets.
  4. total_fw_rate: This is the total byte count for transit packets on the ring.
b. The objective of the method for dynamically allocating link bandwidth on resilient packet ring is to ensure that the link is fully utilized, while the bandwidth is properly allocated among all the competing stations. In order to achieve this, the local_fair_rate is always calculated according to the following steps:
b1. calculate an idle rate (idle_rate) with the equation:

$$idle\_rate = link\_rate - total\_add\_rate - total\_fw\_rate,$$

where link_rate is the byte count for one advertisement interval at full link rate;
b2. if idle_rate<idle_rate_threshold (the idle_rate_threshold could be set to 0.01 or even lower):

$$acc\_idle = (\alpha - 1) * acc\_idle / \alpha,$$

otherwise, $$acc\_idle = acc\_idle + idle\_rate / \beta$$

$$acc\_idle = min(acc\_idle, unreserved\_rate),$$

where acc_idle is basically the integral of the idle rate, and its value is no more than the unreserved rate (unreserved_rate);
b3. Calculate the local fair rate (local_fair_rate) with the formula:

$$local\_fair\_rate = (\delta - 1) * local\_fair\_rate / \delta + add\_rate / (\delta * weight) + acc\_idle / \delta,$$

where Weight is the station weight for weighted fairness algorithm.
c. determining an advertising rate (advertising_rate), which comprises the following steps:
c1. if the value of the received advertising rate is less than the value of the local fair rate (i.e. received_advertising_rate<local_fair_rate), the value of the advertising rate (advertising_rate) is set to the value of the received advertising rate (received_advertising_rate);
c2. if(fw_rate<local_fair_rate), the advertising rate (advertising_rate) is set to the local fair rate (local_fair_rate). This is similar to that of the existing algorithm for handling the disjoint choke points with the single choke point algorithm;
c3. if (add_rate>minimum packet size) or there are packets in the low priority queue to be transmitted, the advertising rate (advertising_rate) is set to the local fair rate (local_fair_rate);
c4. otherwise, the advertising rate (advertising_rate) is set to the received advertising rate (received_advertising_rate).
d. each node on the RPR ring transmits data packets with a rate no more than the advertising rate determined in the third step to ensure that the nodes fairly share the bandwidth ring.

Compared with the existing fairness algorithm in 802.17 standard draft, the method for dynamically allocating link bandwidth on resilient packet ring in this invention introduces integral for the idle rate, so as to obtain 100% of bandwidth utilization. (In most of the cases in practice, only one link can achieve this (100%) due to the advertisement rules for the local_fair_rate.) The new algorithm also avoids the concept of "congestion state" in existing fairness algorithms. The new algorithm in this invention has the following advantages:

Philosophical Advantage:
1. Existing fairness algorithm attempts to achieve fair bandwidth distribution among all the competing stations only when some nodes are in the "congestion state".
2. The method for dynamically allocating link bandwidth on resilient packet ring attempts to ensure 100% link utilization on every segment. For a single choke point fairness algorithm, in most cases, only one link can achieve such link utilization, which is also one of the purposes the fairness algorithm.

Algorithmic Advantage:
1. congestion state: In the existing approach, every station will advertise "null" indicating the maximum bandwidth if there is no congestion point on the ring. The station will advertise non-null value only if it is in the congestion state or receiving advertisement with non-null value. In the new approach, there is no concept of "congestion state" and every station will advertise according to the algorithm above, which significantly reduces the algorithm complexity.
2. measurement of the idle rate: The purpose of such measurement is to ensure 100% usage of the link bandwidth. An integrated (similar to the I function of the PID [Proportional, Integral, and Derivative] controller in the control theory) version of the idle rate contributes to the local_fair_rate. The existing approach will measure many other information which will not be required in the new approach.
3. advertising rate: The determination of advertising_rate is different. In the new approach, the RPR station will advertise its local_fair_rate if the station sends out any packet or if there is any packet waiting to be sent out, conditioning on the local_fair_rate is smaller than the received_advertising rate. (rule c3 above).
4. local fair rate (local_fair_rate): The calculation mechanism to obtain the local_fair_rate is completely different between the existing fairness algorithm and the present invention.

DETAILED DESCRIPTION OF THE INVENTION

Figure 9:
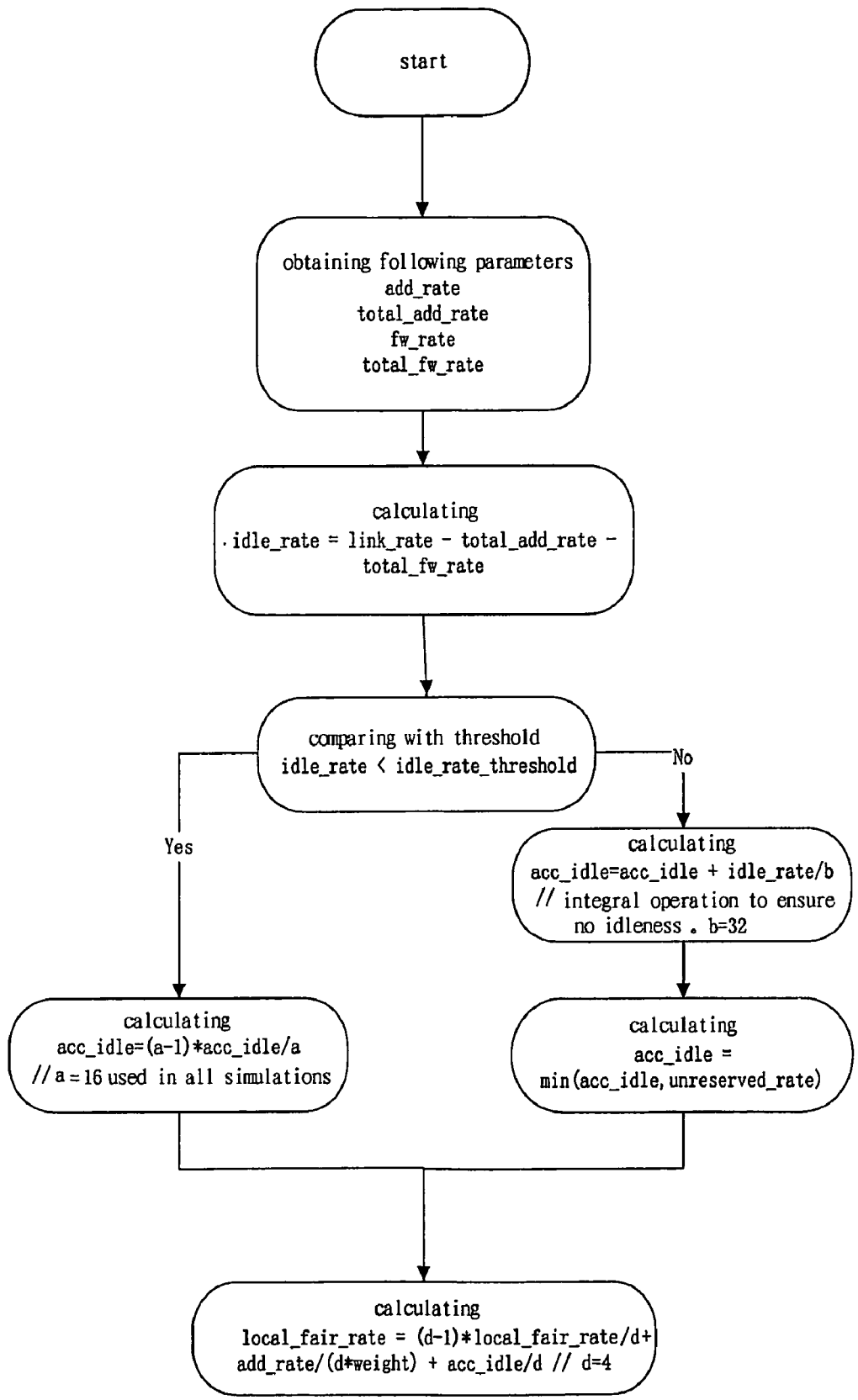
FIG. 9 is the flow chart for determining local_fair_rate in the method of the present invention.
Figure 10:
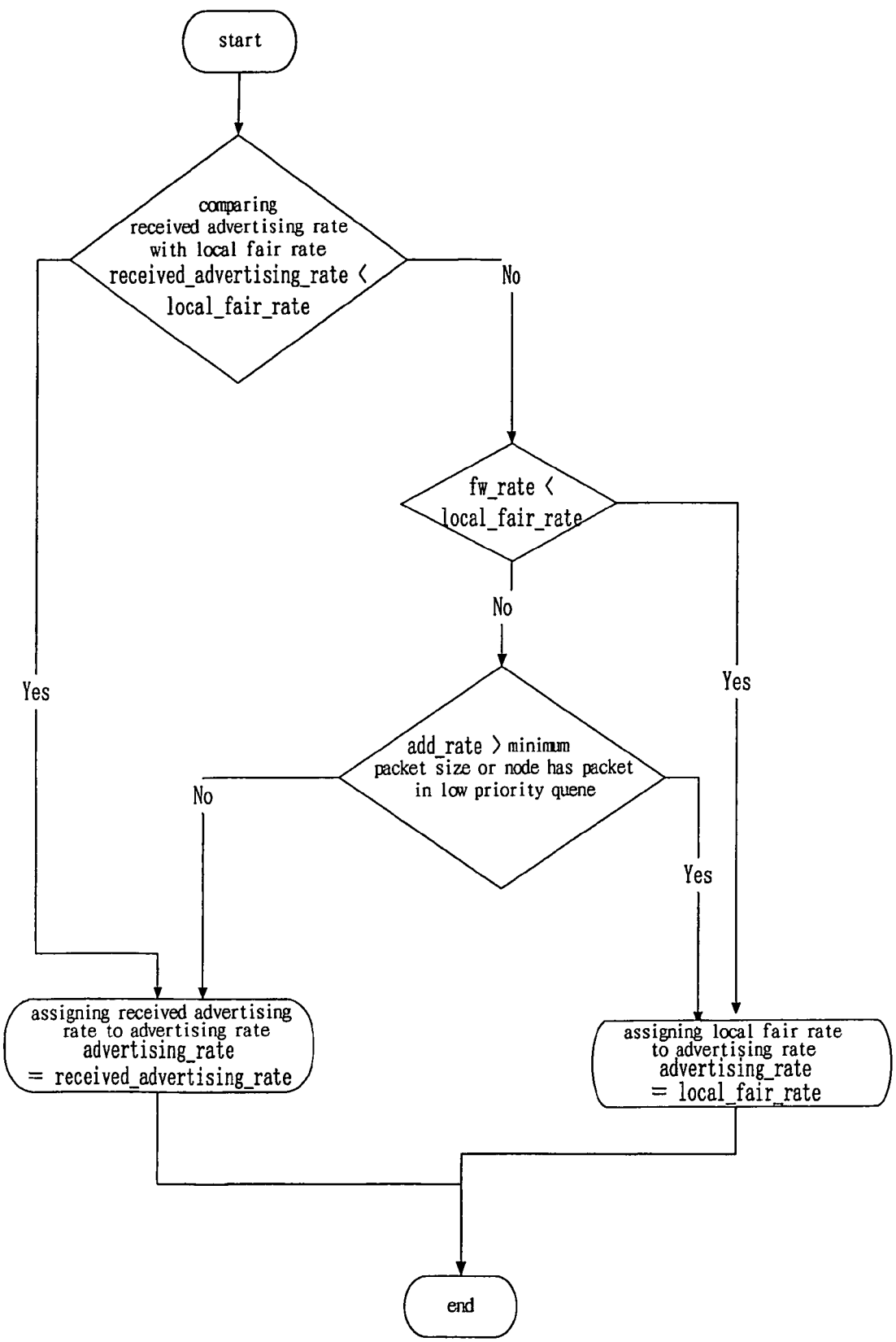
FIG. 10 is the flow chart for determining the advertising_rate in the method of the present invention.

The detailed implementation of the technical solution will be described together with the figures. This invention discloses a method for dynamically allocating link bandwidth on resilient packet ring. The method comprises the following steps in one advertisement interval:

a. measure the values for variables
 1. add_rate: This is the byte count for local packets added onto the ring by the node for the fairness eligible packets.
 2. total_add_rate: This is the total byte count for local packets added onto the ring by the node.
 3. fw_rate: This is the byte count for transit packets on the ring for the fairness eligible packets.
 4. total_fw_rate: This is the total byte count for transit packets on the ring.

b. The objective of the present invention is to ensure that the link is fully used, while the bandwidth is properly allocated among all the competing stations. In order to achieve this, the local_fair_rate is always calculated according to the following steps (see FIG. 9):

b1. calculate an idle rate (idle_rate) with the equation:

$$idle\_rate = link\_rate - total\_add\_rate - total\_fw\_rate,$$

where link_rate is the byte count for one advertisment interval at full link rate;

b2. if idle_rate<idle_rate_threshold (the idle_rate_threshold could be set to 0.01 or even lower):

$$acc\_idle = (\alpha-1)*acc\_idle/\alpha,$$

otherwise, $$acc\_idle = acc\_idle + idle\_rate/\beta$$

$$acc\_idle = min(acc\_idle, unreserved\_rate),$$

where acc_idle is basically the integral of the idle rate, and its value is no more than the unreserved rate (unreserved_rate);

b3. calculate the local fair rate (local_fair_rate) with the formula:

$$local\_fair\_rate = (\delta-1)*local\_fair\_rate/\delta + add\_rate(\delta*weight) + acc\_idle/\delta,$$

where Weight is the station weight for weighted fairness algorithm.

c. determining an advertising rate (advertising_rate), which comprises the following steps (see FIG. 10):

c1. if the value of the received advertising rate is less than the value of the local fair rate (i.e. received_advertising_rate<local_fair_rate), the value of the advertising rate (advertising_rate) is set to the value of the received advertising rate (received_advertising_rate);

c2. if (fw_rate<local_fair_rate), the advertising rate (advertising_rate) is set to the local fair rate (local_fair_rate). This is similar to that of the existing algorithm for handling the dis-joint choke points with the single choke point algorithm;

c3. if (add_rate>minimum packet size) or there are packets in the low priority queue to be transmitted, the advertising rate (advertising_rate) is set to the local fair rate (local_fair_rate);

c4. otherwise, the advertising rate (advertising_rate) is set to the received advertising rate (received_advertising_rate).

d. each node on the RPR ring transmits data packets with a rate no more than the advertising rate determined in the third step to ensure that the nodes fairly share the bandwidth ring.

Simulation studies have been performed on this invention. The simulation studies cover all the 8 cases suggested by IEEE 802.17 working group for fairness algorithm evaluation and the inter-operation test between the existing fairness algorithm and this invention. Selected result will be presented here, with the rest of them available on request.

Figure 1:
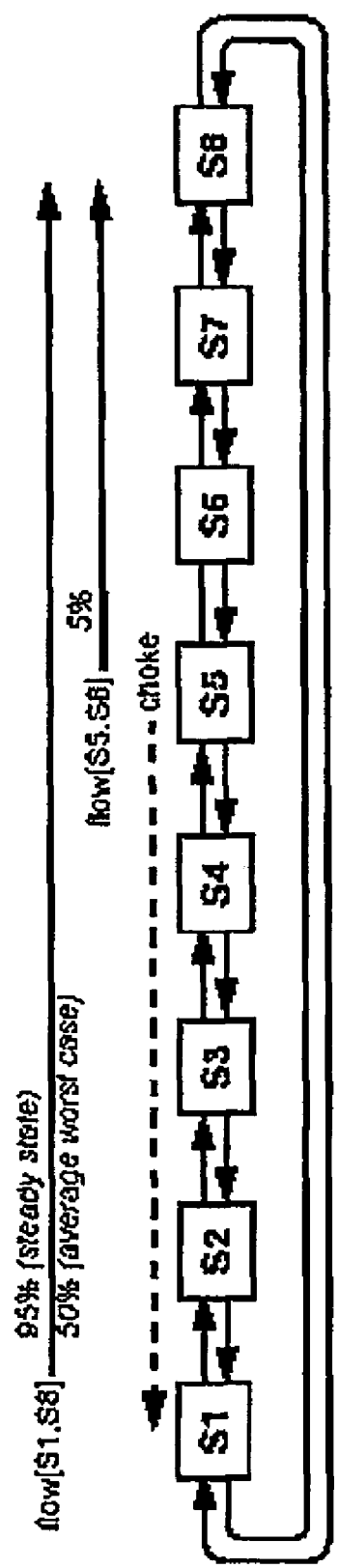
FIG. 1 shows the fairness scenario of none-greedy and greedy sources sharing link bandwidth. (detailed as choking high/low bandwidth pairs example in Annex I. 3.7 in IEEE802.17 draft 2.4).
Figure 2:
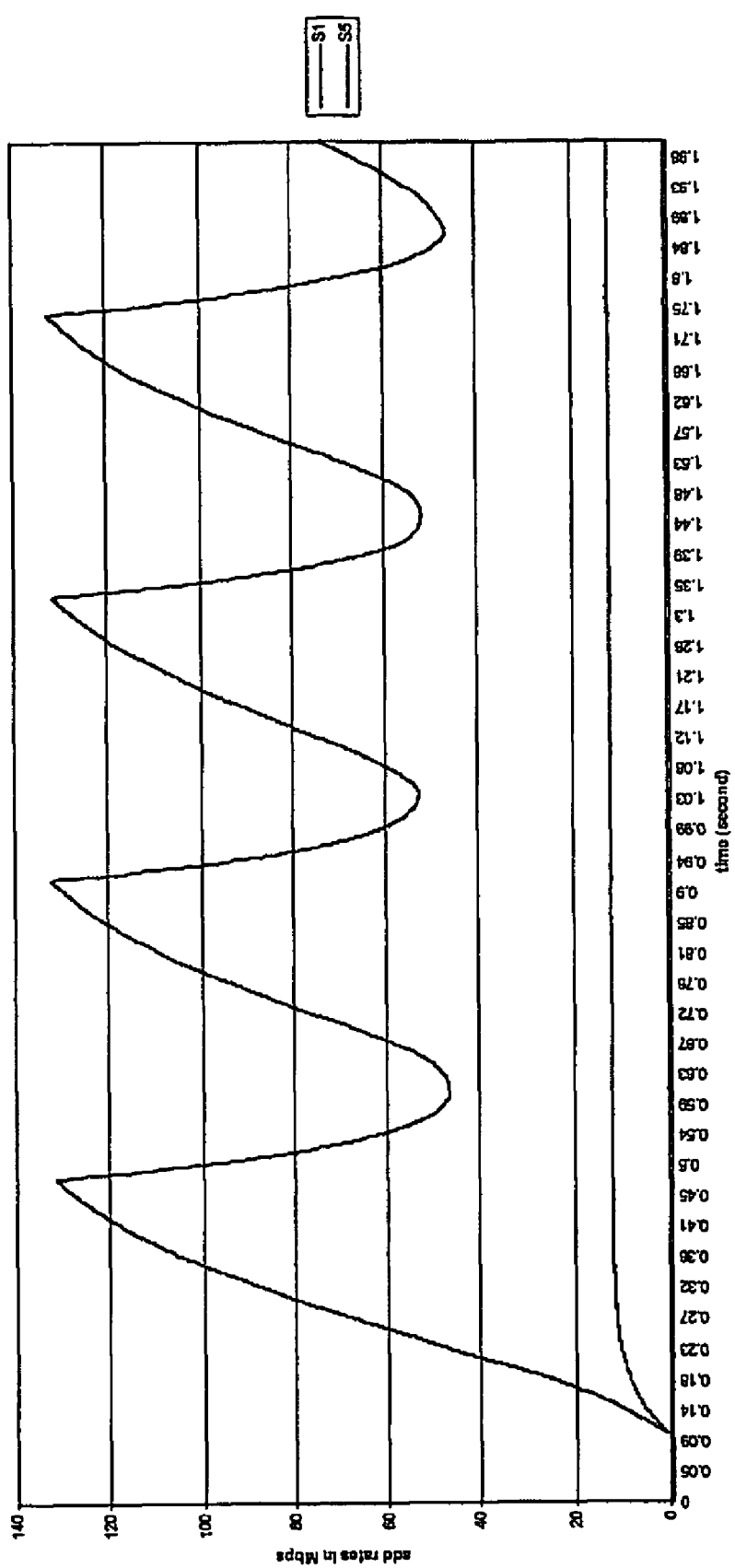
FIG. 2 is the simulation result of the example in FIG. 1 using existing fairness algorithm aggressive mode.

Fairness Scenario (1)—High-low Bandwidth:

The high-low bandwidth setup is shown in FIG. 1. The ideal bandwidth allocation for node S5 is 12.5M (more than 5% due to the particular simulation parameters), and that for node S1 is 137.5M. The simulation result of the aggressive mode is shown in FIG. 2. The bandwidth allocated to node S1 oscillates between 46M and 130M under the aggressive mode. That is the main reason for introducing the conservative mode of the existing fairness algorithm. The main issue with the conservative mode is maximum 95% bandwidth utilization, which leads to inferior performance when all the sources are greedy sources.

Figure 3:
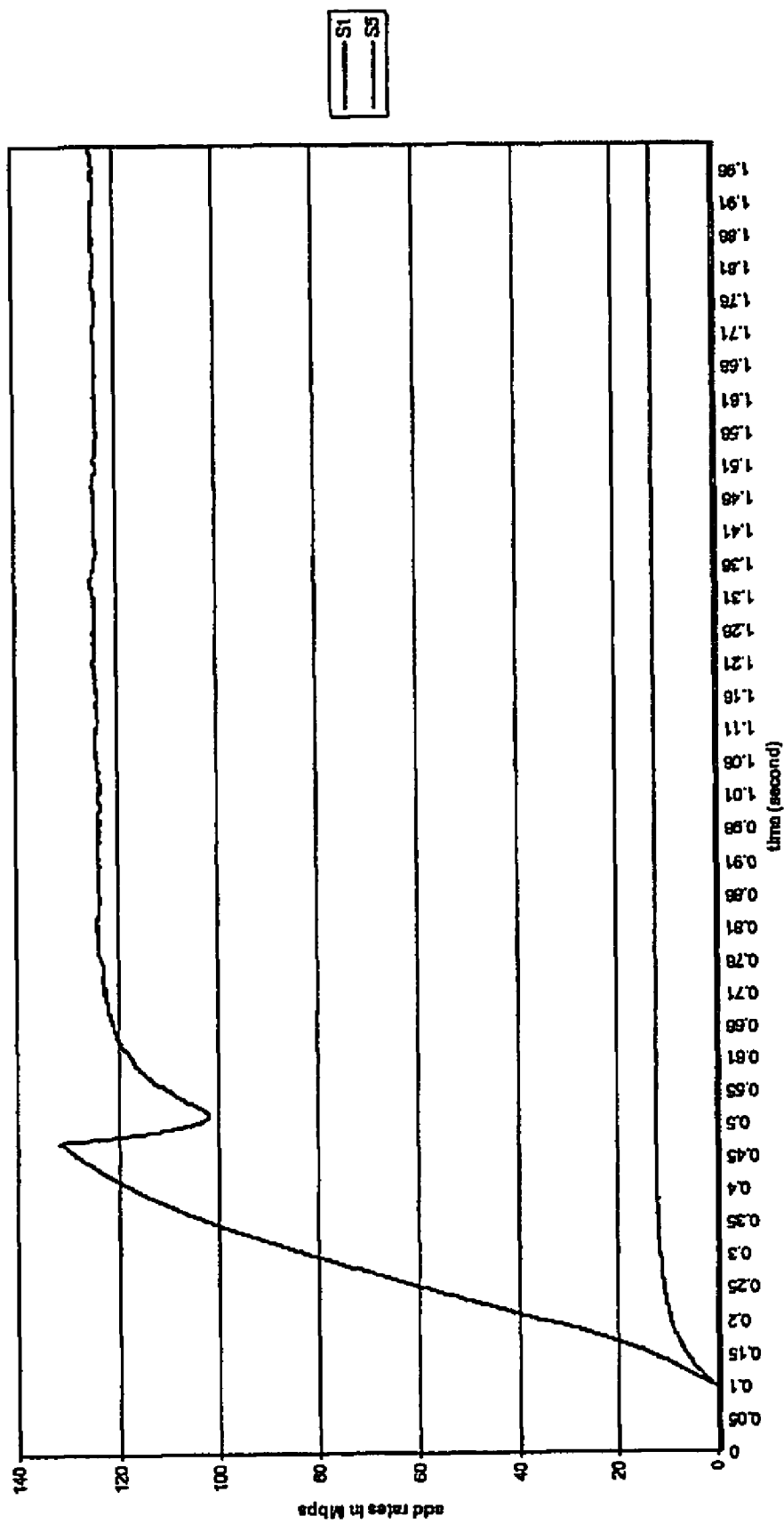
FIG. 3 is the simulation result of the example in FIG. 1 using existing fairness algorithm conservative mode.

FIG. 3 shows the simulation result of the conservative mode.

Figure 8:
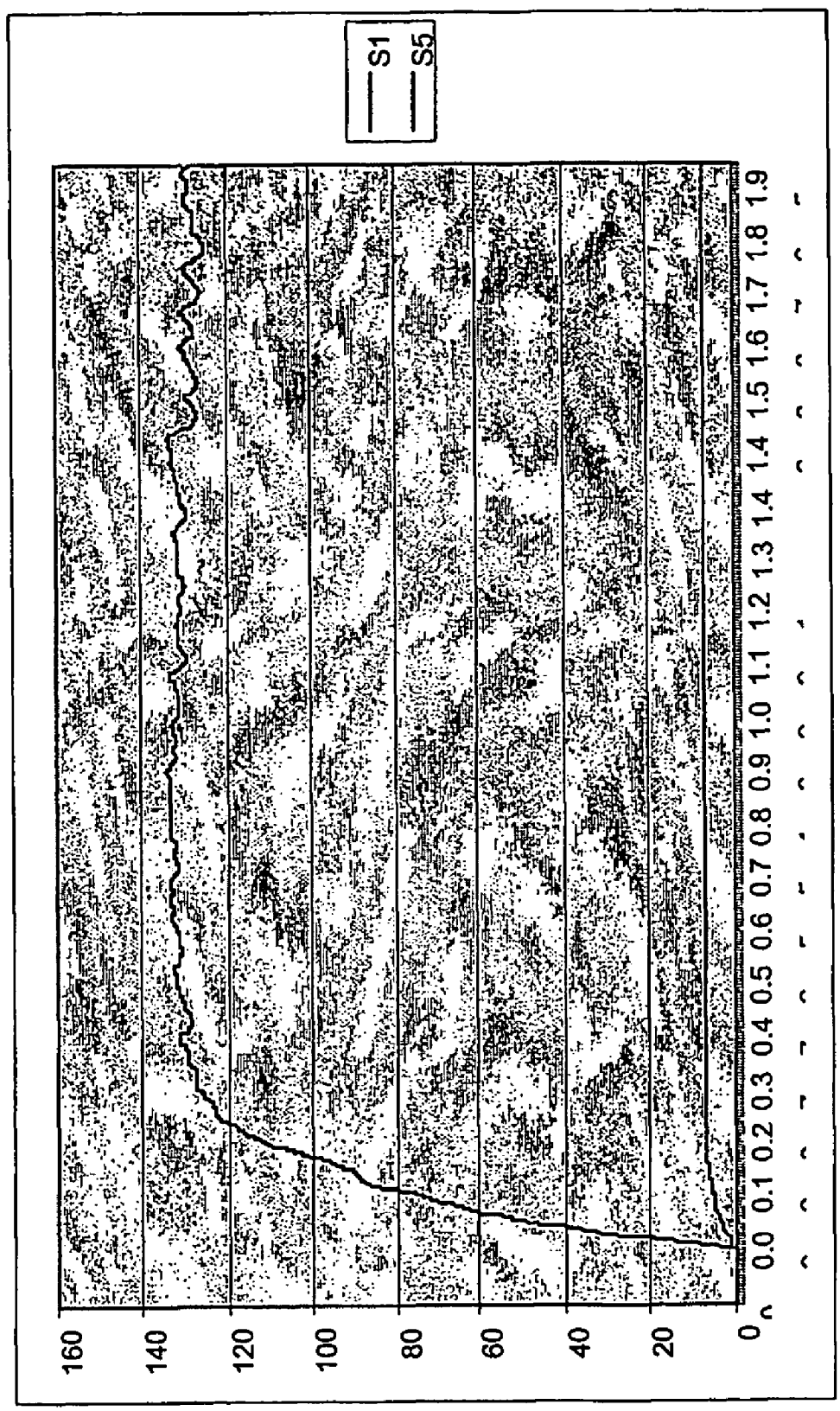
FIG. 8 is the simulation result of the fairness scenario in FIG. 1 using the method in this invention.

FIG. 8 shows the simulation result of the method for dynamically allocating link bandwidth on resilient packet ring.

The simulation results show that the present invention yields high bandwidth utilization, as shown in FIG. 8. The present invention achieves almost 100% bandwidth utilization. Comparing with the aggressive mode shown in FIG. 2, it can avoid bandwidth wastage.

Figure 4:
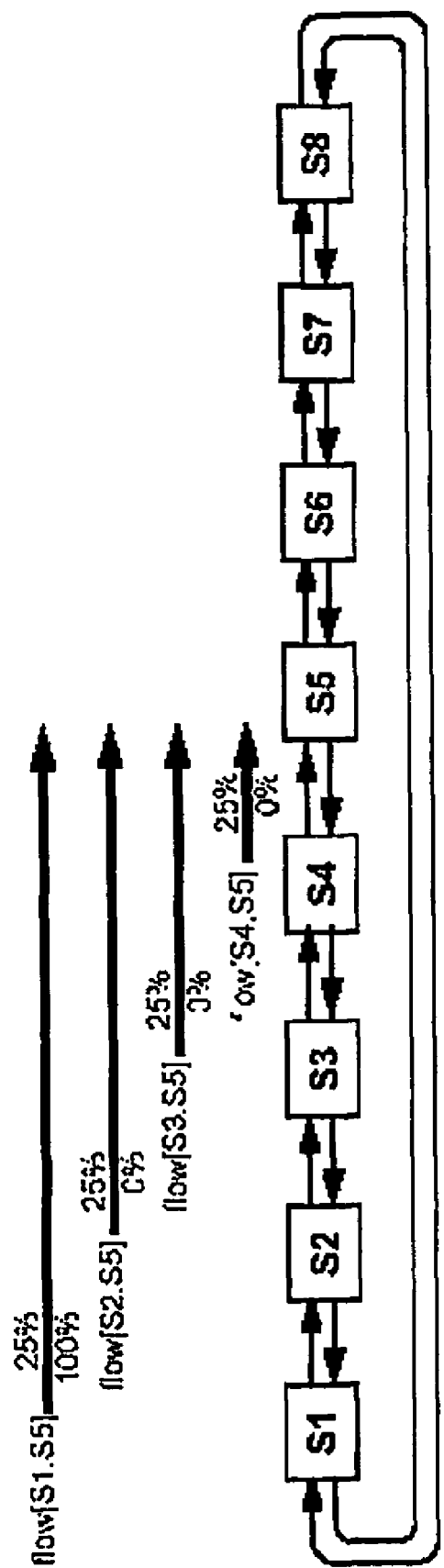
FIG. 4 shows fairness scenario with four sources requesting FE packet transmission (see the parking lot example detailed by Annex I.3.1 in IEEE802.17 draft 2.4)

Fairness Scenario (2)—Parking Lot:

FIG. 4 shows the station arrangement and the traffic requirement.

Figure 5:
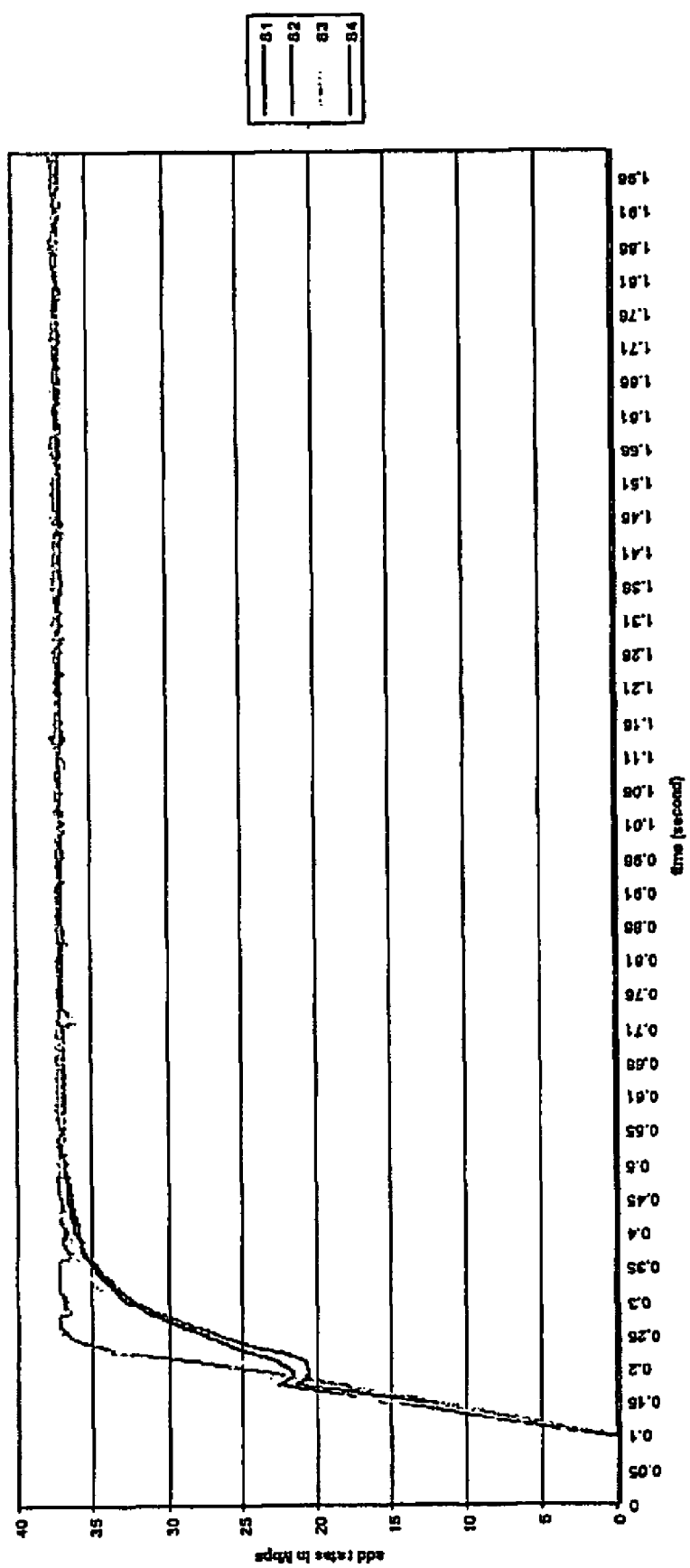
FIG. 5 is the simulation result of the fairness scenario in FIG. 4 under the existing fairness algorithm aggressive mode.

FIG. 5 is the simulation result of the fairness scenario in FIG. 4 under the existing fairness algorithm aggressive mode.

Figure 6:
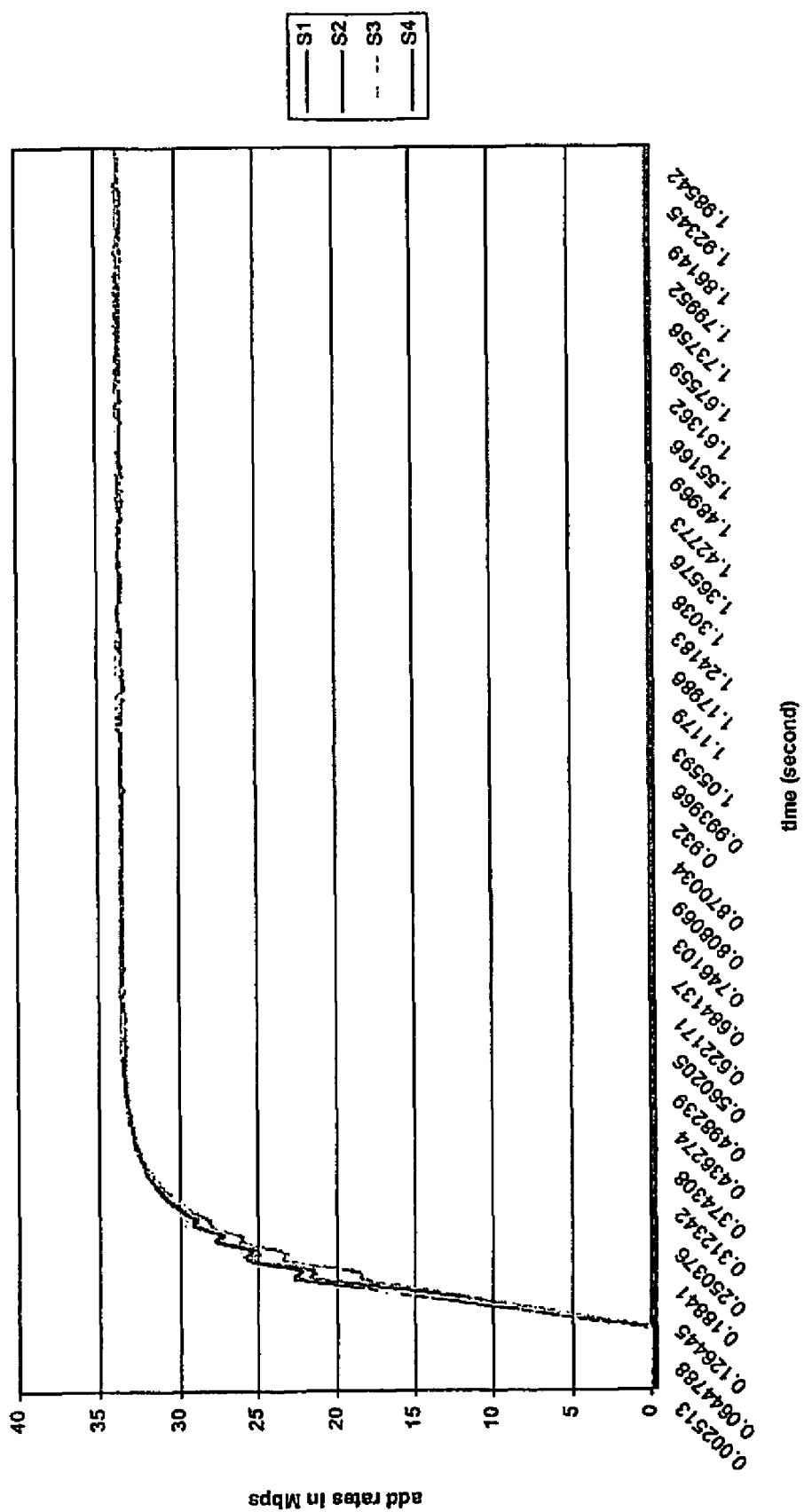
FIG. 6 is the simulation result of the fairness scenario in FIG. 4 under the existing fairness algorithm conservative mode.

FIG. 6 is the simulation result of the fairness scenario in FIG. 4 under the existing fairness algorithm conservative mode.

Figure 7:
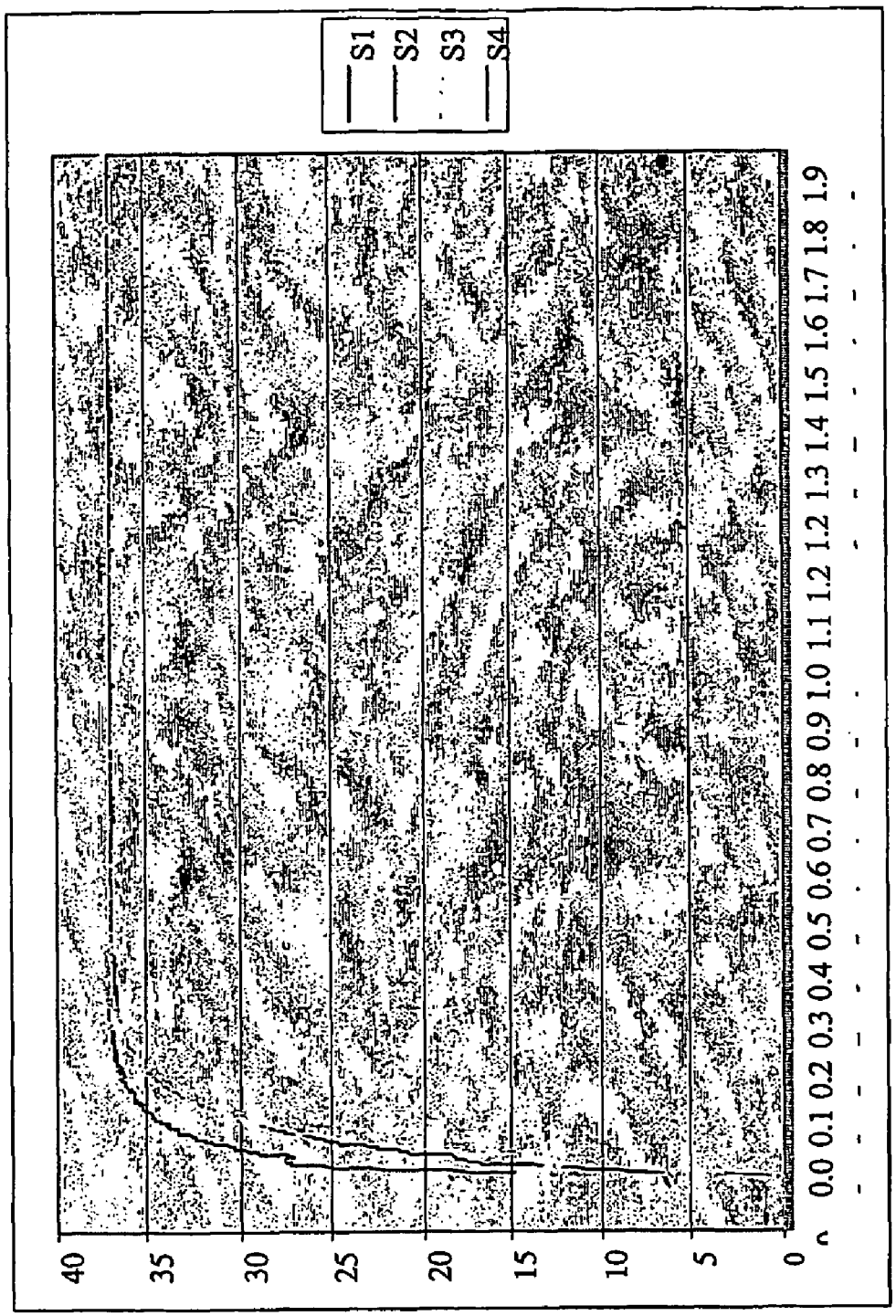
FIG. 7 is the simulation result of the fairness scenario in FIG. 4 using the method in this invention.

FIG. 7 is the simulation result of the fairness scenario in FIG. 4 using the method in this invention.

The fundamental requirement for bandwidth allocation is the fairness. It can be seen from these simulation results that the new algorithm can ensure the fair bandwidth allocation. So can all the existing fairness algorithms. The new algorithm achieves the same bandwidth utilization as aggressive mode does. The bandwidth utilization of the conservative mode is only about 90%.

The invention claimed is:

1. A method for dynamically allocating link bandwidth on a Resilient Packet Ring having a plurality of nodes, which is based on fairness bandwidth calculation per advertisement interval, comprising the following steps in one advertisement interval:

measuring an add rate which is a byte count for local packets added onto the ring by at least one of the nodes for fairness eligible packets, a total_add_rate which is a total byte count for local packets added onto the ring by at least one of the nodes, an fw_rate which is a byte count for transit packets on the ring for the fairness eligible packets, and a total_fw_rate which is a total byte count for transit packets on the ring; the counts being related to data packets on each node of the Resilient Packet Ring;

calculating a local fair rate of each node on the Resilient Packet Ring using the measured counts;

determining an advertising rate of each node on the Resilient Packet Ring based on the local fair rate and an advertising rate provided by a downstream node; and each node on the Resilient Packet Ring transmitting data packets with the determined advertising rate;

wherein the step of calculating a local fair rate of each node on the Resilient Packet Ring using the measured counts comprises:

calculating an idle rate=link_rate−total_add_rate−total_fw_rate, wherein the link_rate is a byte count in one advertisement interval at a full link rate; and if idle_rate is less than an idle_rate_threshold, wherein the idle_rate_threshold is set to 0.01 or less:

$$acc\_idle=(\alpha-1)*acc\_idle/\alpha,$$

otherwise, $$acc\_idle=acc\_idle+idle\_rate/\beta$$

acc_idle=min(acc_idle, unreserved_rate), wherein the acc_idle is substantially the integral of the idle rate, and its value is no more than the unreserved rate, which is the unreserved link rate; and calculating a local fair rate=$(\delta-1)$*local_fair_rate/$\delta$+add_rate($\delta$*weight)+acc_idle/$\delta$, wherein, the weight is the station weight for a weighted fairness algorithm.

2. The method for dynamically allocating link bandwidth on a Resilient Packet Ring having a plurality of nodes according to claim 1, wherein each node on the Resilient Packet Ring transmits data packets with a rate not more than the determined advertising rate, to ensure a fair bandwidth allocation to the nodes on the Resilient Packet Ring.

3. A method for dynamically allocating link bandwidth on a Resilient Packet Ring having a plurality of nodes, which is based on fairness bandwidth calculation per advertisement interval, comprising the following steps in one advertisement interval:

measuring a group of counts related to data packets on each node on the Resilient Packet Ring;

calculating a local fair rate of each node on the Resilient Packet Ring using the measured counts;

determining an advertising rate of each node on the Resilient Packet Ring based on the local fair rate and an advertising rate provided by a downstream node; and each node on the Resilient Packet Ring transmitting data packets with the determined advertising rate;

wherein the step of determining an advertising rate of each node on the Resilient Packet Ring based on the local fair rate and an advertising rate provided by a downstream node comprises:

each node on the Resilient Packet Ring setting an advertising_rate to the advertising rate provided by its downstream node if the advertising rate provided by its downstream node is less than the local fair rate; otherwise each node on the Resilient Packet Ring setting the advertising_rate to a local_fair_rate if a fw_rate is less than the local_fair_rate; otherwise, each node on the Resilient Packet Ring setting the advertising_rate to the local_fair_rate if an add_rate is more than a minimum packet size or there are packets in a low priority queue to be transmitted;

otherwise, each node on the Resilient Packet Ring setting the advertising_rate to the advertising rate provided by its downstream node.

4. The method for dynamically allocating link bandwidth on a Resilient Packet Ring having a plurality of nodes according to claim 3, wherein each node on the Resilient Packet Ring transmits data packets with a rate not more than the determined advertising rate, to ensures a fair bandwidth allocation to the nodes on the Resilient Packet Ring.

* * * * *